United States Patent [19]

Koek et al.

[11] Patent Number: 4,728,981

[45] Date of Patent: Mar. 1, 1988

[54] IMAGING LENS ARRAY AND OPTICAL PRINT HEAD

[75] Inventors: Kevin C. Koek; William T. Matthias, both of Rochester; James T. Barton, Fairport, all of N.Y.

[73] Assignee: Eastman Kodak Company, Rochester, N.Y.

[21] Appl. No.: 937,846

[22] Filed: Dec. 4, 1986

Related U.S. Application Data

[63] Continuation of Ser. No. 884,944, Jul. 11, 1986, abandoned.

[51] Int. Cl.⁴ .............................................. G03B 27/00
[52] U.S. Cl. ............................................. 355/1; 355/46
[58] Field of Search ....................................... 355/1, 46

[56] References Cited

U.S. PATENT DOCUMENTS

| | | | |
|---|---|---|---|
| 3,658,407 | 4/1972 | Kitano et al. | 355/1 |
| 4,059,345 | 11/1977 | Kawamura et al. | 355/1 |
| 4,421,400 | 12/1983 | Dannatt | 355/1 |
| 4,427,284 | 1/1984 | Danatt | 355/1 |
| 4,528,573 | 7/1985 | Behrens et al. | 355/1 |

Primary Examiner—Monroe H. Hayes
Attorney, Agent, or Firm—Milton S. Sales

[57] ABSTRACT

Apparatus is disclosed for locating an imaging lens array formed of a plurality of gradient index optical fibers on a print head having a linear array of light sources, such that the light sources are readily spaced from a photosensitive surface a distance equal to the total conjugate of the imaging lens array and the optical fibers are accurately spaced from the light sources in a direction along their optical axes so as to be midway between the light sources and the photosensitive surface.

2 Claims, 8 Drawing Figures

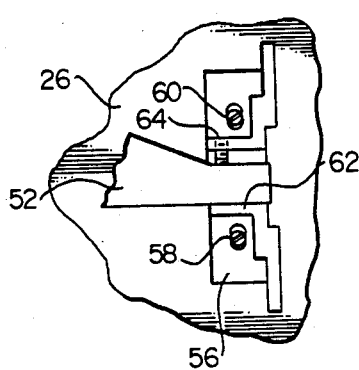
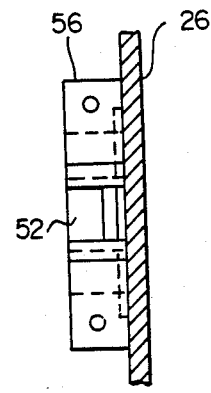
FIG. 5  FIG. 6
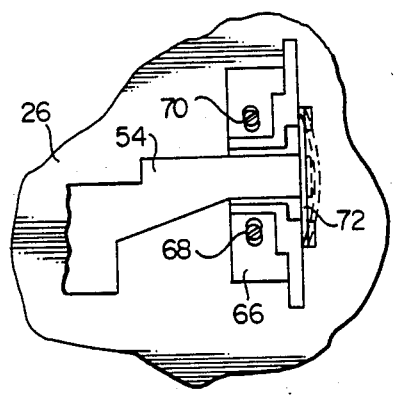
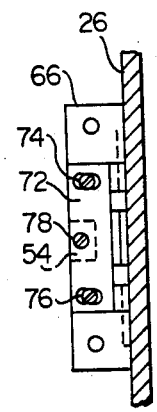
FIG. 7  FIG. 8

IMAGING LENS ARRAY AND OPTICAL PRINT HEAD

CROSS REFERENCE TO RELATED APPLICATION

This application is a continuation application of U.S. Ser. No. 884,944, filed on July 11, 1986, now abandoned, in the name of Kevin C. Koek et al.

BACKGROUND OF THE INVENTION

1. Field of the Invention

The present invention relates to optical print heads and to means for transmitting light emitted from the print heads to a photosensitive surface, and more particularly to means for accurately spacing (1) the print head from the photosensitive surface and (2) the transmitting means from the print head to maintain high resolution and good exposure uniformity.

2. Description of the Prior Art

High speed optical printing devices used in data processing systems are intended for converting electric input signals into printed form, and include photosensitive means and light sources such as linear arrays of light emitting diodes (LED's), photodiodes, or similar devices. Light from a source is often transmitted to the photosensitive means via a plurality of gradient index optical fibers forming an imaging lens array. Such imaging lens arrays are commercially available as SELFOC (a trademark of Nippon Sheet Glass Co., Ltd.) lenses in a staggered, two-row bundle of optical fibers as described in U.S. Pat. No. 3,658,407, patented on April 25, 1972. Reference may be made to that patent for details of the lens arrays.

A gradient index optical fiber 10 is illustrated in FIG. 1. The refractive index distribution of the optical fiber varies parabolically outwards from the longitudinal axis of the optical fiber towards the peripheral portion thereof.

FIG. 2 shows an imaging lens array 12 formed of a staggered, two-row bundle of optical fibers 10. If the distances $L_1$ and $L_2$ are properly selected and equal, then there is obtained an erect image at a magnification of one of an object. Distance $L_{TC}$ represents the total conjugate of the lens (i.e., the distance between the object and image planes). Accordingly:

$$L_1 = L_2,$$

and $$L_{TC} = L_F + L_1 + L_2$$

Where $L_F$ is the length of optical fibers 10 of imaging lens array 12.

Imaging lens arrays such as shown in FIG. 2 have been proposed for transmitting light between an array of LED's 14 and photosensitive means such as a photoconductive member 16. For optimum resolution, dimensions $L_{TC}$, $L_1$, and $L_2$ must be accurately set and maintained. In the design of prior art devices such as shown in U.S. Pat. No. 4,147,412, it is assumed that the total conjugate $L_{TC}$ does not vary from lens to lens and that, as such, the spacing between the object plane and the image plane can be fixed at the total conjugate distance. While this approximation is adequate for low resolution applications, in fact however, the lens parameters $L_{TC}$ and $L_F$ vary considerably between manufacturers, and even between lenses of the same manufacturer.

It is, therefore, an object of the present invention to provide means for locating an imaging lens array on a print head and for locating the print head relative to photosensitive means at the image plane in a way which allows for convenient and accurate compensation for variations in lens dimensions. Several significant benefits are provided by the locating means to be described. These benefits stem from the precise locational and adjustment capabilities built into the locating means, and include (1) low parts cost due to relaxed tolerances, (2) elimination in most instances of adjustments of the locating means at the machine level, both in final in-plant assembly and in the field because such adjustments have been affected during sub-assembly of the lens array to the print head, and (3) ability to perform direct, in-the-field replacement due to the interchangeability of print head and lens array sub-assemblies.

SUMMARY OF THE INVENTION

In accordance with the present invention, novel apparatus is provided for locating an imaging lens array formed of a plurality of gradient index optical fibers on a print head having a linear array of light sources, such that (1) the light sources are readily spaced from a photosensitive surface a distance equal to the total conjugate of the imaging lens array, and (2) the optical fibers are accurately spaced from the light sources in a direction along their optical axes so as to be midway between the light sources and the photosensitive surface.

In a preferred embodiment of the present invention, locating means are provided for removably supporting the print head relative to the photosensitive surface such that the light sources of the print head are spaced from the photosensitive surface by the total conjugate of the optical fibers. Mounting means support the lens array to the print head so as to center the lens array between the light sources and the photosensitive surface.

The invention, and its objects and advantages, will become more apparent in the detailed description of the preferred embodiment presented below.

BRIEF DESCRIPTION OF THE DRAWINGS

In the detailed description of the preferred embodiment of the invention presented below, reference is made to the accompanying drawings in which:

FIGS. 5 and 6 are top and side views, respectively, showing details of a portion of the locating means; and FIGS. 7 and 8 are top and side views, respectively, showing details of another portion of the locating means.

DETAILED DESCRIPTION OF THE PREFERRED EMBODIMENT

The present description will be directed in particular to elements forming part of, or cooperating more directly with, apparatus in accordance with the present invention. It is to be understood that elements, components, and/or sub-components not specifically shown or described may take various forms well known to those skilled in the art.

To assist in understanding the present invention, an electrophotographic copier/printer in which the invention may be used will be briefly described. It will be understood, however, that the apparatus of the present invention can be used in other types of apparatus.

Figure 3:
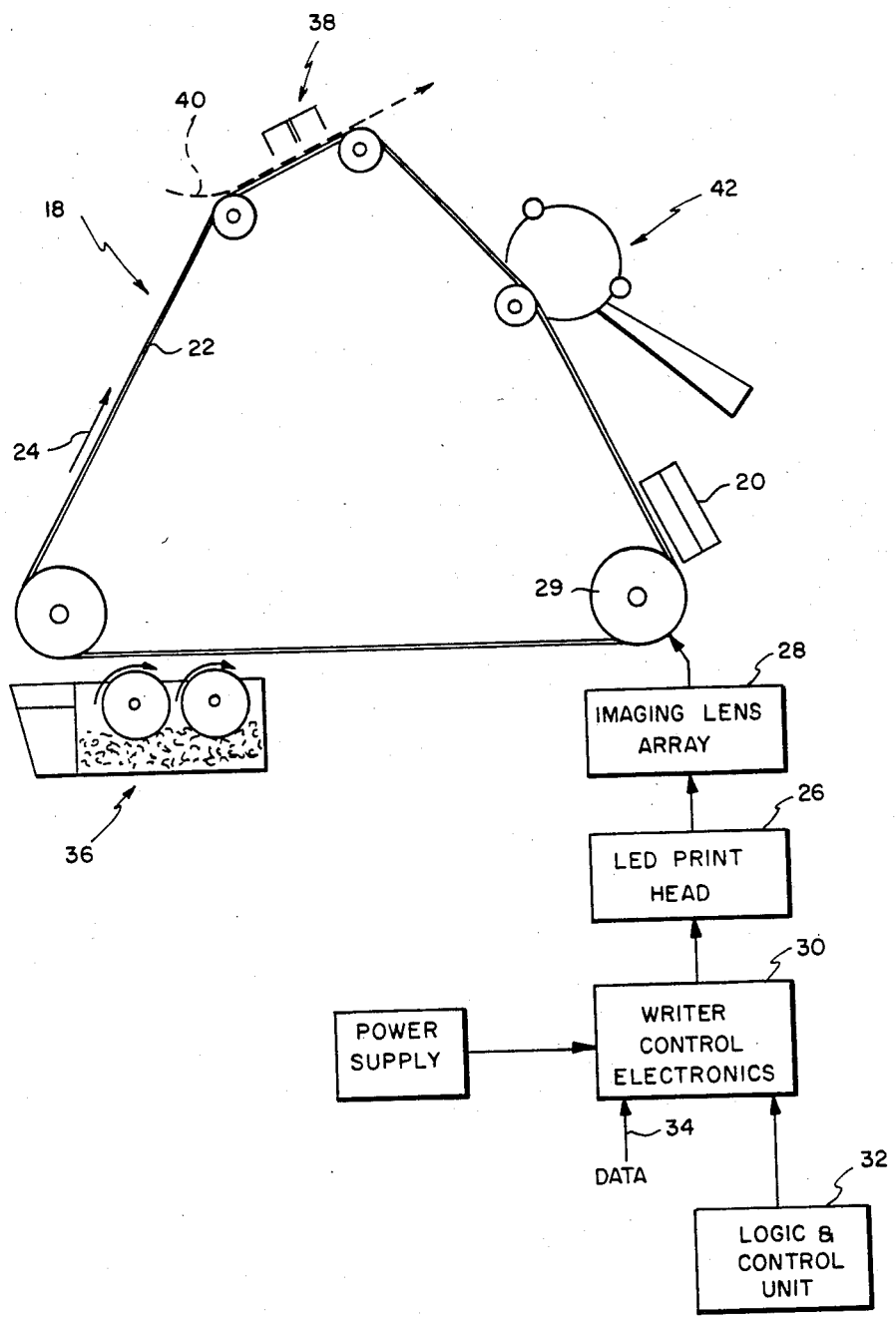
FIG. 3 is a schematic vertical section of an electrophotographic apparatus including the image lens array and print head of FIG. 2.

Referring to FIG. 3, electrophotographic apparatus generally designated 18 includes a charging station 20 for applying a uniform charge to photosensitive means such as a photoconductor 22. The photoconductor illustrated is an endless belt trained about a plurality of rollers and driven in the direction of an arrow 24. Light from selected LED's of a print head 26 is transmitted by an imaging lens array 28 onto the surface of photoconductor 22 as the photoconductor passes over a roller 29. The light striking the charged photoconductor selectively dissipates portions of the charge to form an electrostatic latent image on the photoconductor. Selection of the specific LED's of the print head which are activated at any given time is by means of writer control electronics 30, a logic and control unit 32, and the data entering along line 34.

A magnetic brush development station 36 transfers toner particles to the photoconductor for developing the latent image. The resulting toned image then travels to a transfer and detack station 38 where the image is transferred to a copy sheet fed from a supply, not shown, along path 40. After the photoconductor passes through transfer and detack, it is cleaned at station 42 and is available for another cycle of operation.

Figure 1:
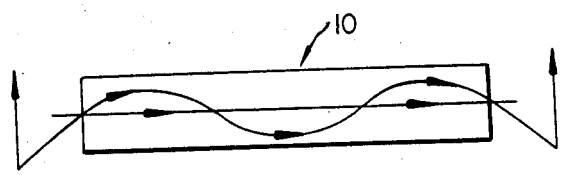
FIG. 1 is a representation of an optical fiber in accordance with the prior art and wherein the geometry of the fiber is illustrated.
Figure 2:
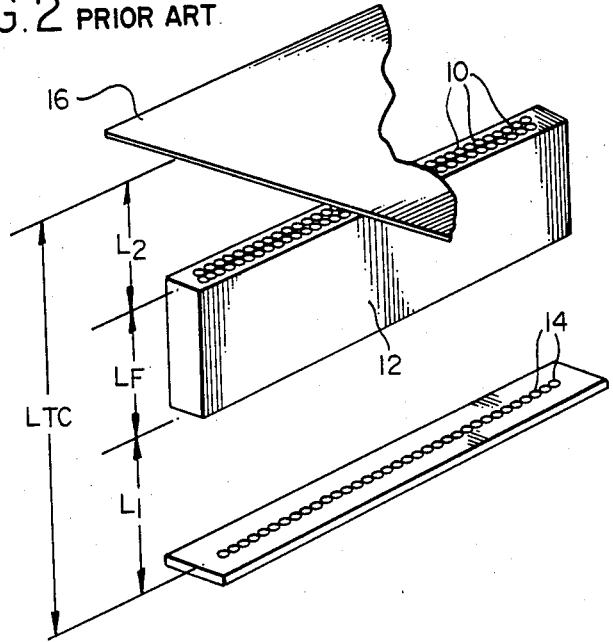
FIG. 2 is a perspective view of an imaging lens array formed by a staggered, two-row bundle of optical fibers as shown in FIG. 1, and also shows a print head with an LED array at the object plane and photosensitive means at the image plane.
Figure 4:
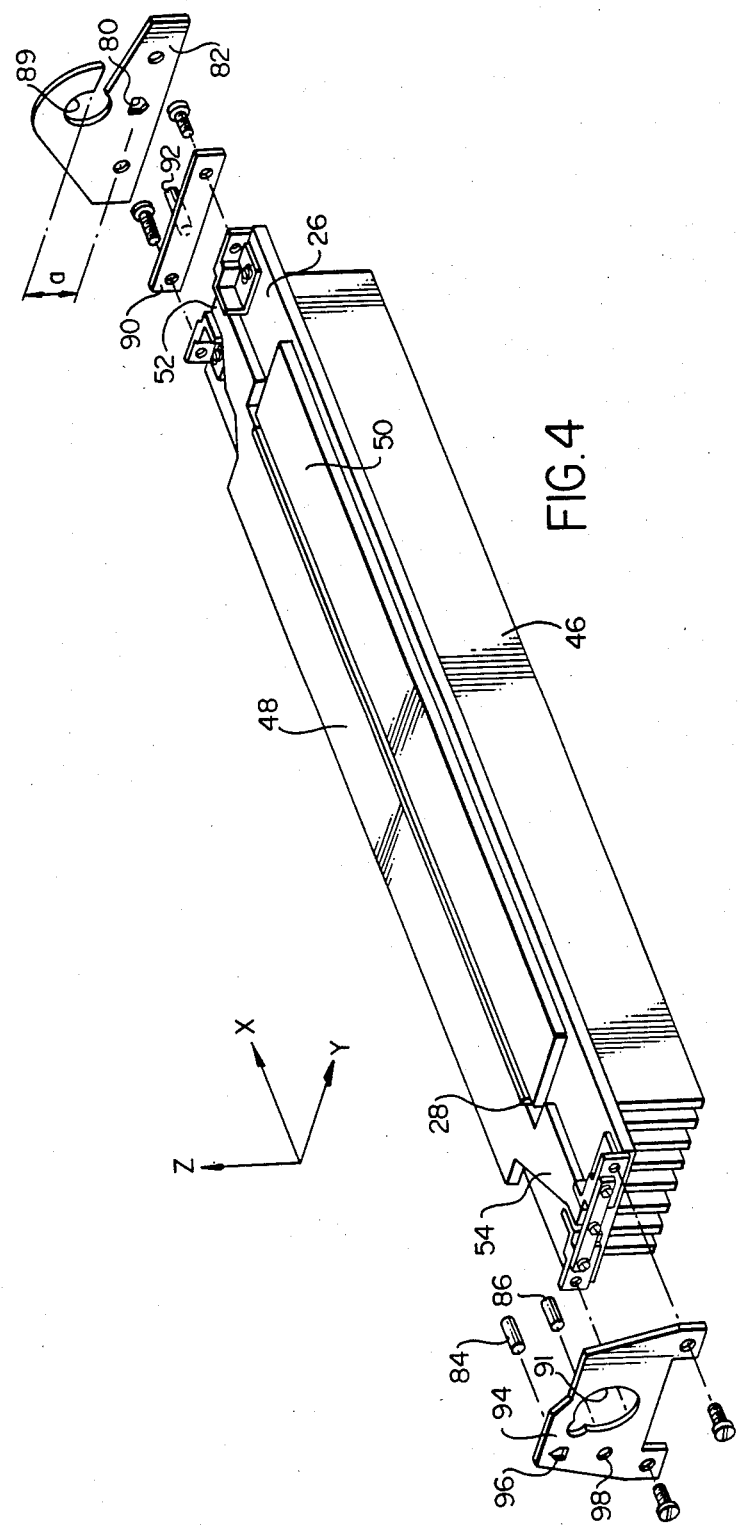
FIG. 4 is a perspective view of a print head and imaging lens array sub-assembly with locating means in accordance with the present invention.

Referring to FIG. 4, a sub-assembly 44 includes the print head 26 and imaging lens array 28, both of which are schematically shown in FIG. 3. The print head per se is a conventional, commercially-available unit with a linear array of LED's, a transparent faceplate covering the LED's, and heat-conducting cooling vanes 46. Imaging lens array 28 includes a staggered, two-row bundle of gradient index optical fibers disposed across the LED array of the print head. The ends of the optical fibers are accurately spaced in a Z-direction (along the optical axes of the fibers) from the LED's by a distance $L_1$ as shown in FIG. 2 as well as being accurately positioned in a Y-direction (lateral to the LED array) so as to align with the LED's along the length of the print head. The lens array is preferably longer than the LED array so that the position of the imaging lens array along the X-direction (along the length of the LED array) is not as critical.

Commercially available imaging lens arrays of the typed discussed herein are somewhat flexible and tend to bend. It will be appreciated that very little bending would be needed to cause significant defocusing of the image of the LED's on the photoconductor. Accordingly, imaging lens array 28 has been bonded between two stiffeners 48 and 50. Stiffener 48 has a pair of arms 52 and 54 for attaching the stiffener (and thereby the imaging lens) to the print head.

Details of the attachment means for arm 52 are better seen in FIGS. 5 and 6. An interface block 56 is slidably mounted on print head 26 by a pair of screws 58 and 60 and elongated holes in the block through which the screws pass. After imaging lens array 28 has been properly aligned laterally with the LED array (the Y-direction of FIG. 4), block 56 is slid (the screws being loose) until an upstanding wing 62 abuts arm 52 of stiffener 48. Screws 58 and 60 are tightened. When the imaging lens array is properly spaced from the LED array (the Z-direction of FIG. 4) by a distance $L_1$ of FIG. 2, a set screw 64 is tightened to totally constrain arm 52 relative to the print head.

The attachment means for arm 54 can best be seen in FIGS. 7 and 8 (as well as FIG. 4. The coefficient of thermal expansion of the imaging lens array and stiffeners may differ from that of the print head, and must be accounted for in the design of the mounting means. The attachment of arm 54 is not the same as that of arm 52 and provides for such thermal expansion. After imaging lens array 28 has been properly aligned with and spaced from the LED array, as described above, final attachment of arm 54 can be effected. An interface block 66 is slidably mounted in the Y-direction on print head 26 by a pair of screws 68 and 70 which pass through respective elongated holes in block 66. A flexible steel plate 72 is mounted at its ends to block 66 by a pair of screws 74 and 76 which also pass through elongated holes to permit vertical (Z-direction) movement of the plate relative to the interface block.

During assembly, interface block 66 and plate 72 thereon are moved relative to arm 54 until a screw hole in the plate aligns with a predrilled and tapped hole in the end of arm 54. A screw 78 is inserted into the tapped hole and screws 68, 70, 74, 76 and 78 are tightened to secure the sub-assembly elements such that movement of imaging lens array 28 in directions along its optical axis (Z-direction) and lateral to the LED array (Y-direction) is inhibited, while thermal expansion and contraction of the imaging lens array and stiffeners along their lengths (X-direction) at a rate different than expansion of the print head is permitted.

By the apparatus described, mounting means are provided for the imaging lens to maintain critical spacing between the print head LED array and the imaging lens array equal to distance $L_2$. Critical adjustments can be easily and rapidly made during assembly without the need for high precision parts. However, for optimum resolution and exposure uniformity, print head sub-assembly 44 must be mounted on electrophotographic apparatus 18 such that the LED array is spaced from the surface of photoconductor 22 by a distance $L_{TC}$ equal to the total conjugate of imaging lens array 28, and the imaging lens array itself must be spaced by distance $L_2$ from the photoconductor. To that end, adjustable mounting means have been provided, whereby the distance between the LED array of print head 26 and the surface of photoconductor 22 can be adjusted to match the total conjugate distance $L_{TC}$ of the specific imaging lens array attached to the print head.

Three locating structures are provided on the electrographic apparatus. The locating structures include a V-shaped opening 80 in a plate 82, and a pair of pins 84 and 86 which extend from a mechanism plate (not shown) in the electrophotographic apparatus. Opening 80 and pins 84 and 86 are fixed in the electrographic apparatus mainframe at accurately known positions relative to the bearings of roller 29. This spacial relationship is intended to be substantially invariant from machine to machine so that once set up, a print head assembly 44 can be mounted on any apparatus, in most instances, without further adjustment in the field.

A pair of mounting brackets 90 and 94 are adjustably fixable to print head 26 to attach print head assembly 44 to the apparatus mainframe. Bracket 90 includes a pin 92 and a pair of elongated slots through which the plate can be screwed to interface block 56. Second bracket 94 has holes 96 and 98 and a pair of elongated slots through which the second plate can be screwed to interface block 66. Holes 89 and 91 in plate 82 and bracket 94 are provided for the bearings of roller 29.

Once fixed to the print head, the mounting brackets can be used to attach print head assembly 44 to the electrographic apparatus mainframe. Pin 92 extends through V-shaped opening 80 in plate 82 and defines a reference surface which rests against the bottom of the hole. Pin 84 of the electrophotographic apparatus mainframe extends through hole 96, whose reference surfaces rest on the pin. Thus, the distance between the print head and the photoconductor is determined solely by adjusting the positions of brackets 90 and 94 on the print head. Pin 86 extends through hole 98 to inhibit rotation of bracket 94 about pin 84, thereby totally constraining the print head assembly.

Before the screws holding brackets 90 and 94 to the print head are tightened, the positions of the brackets are adjusted such that the stand-off of the LED array to the photoconductor is equal to the total conjugate of the imaging lens array. The determination of the stand-off dimension is not a part of the present invention, and various methods are available. For example, a trial and error method can be used wherein test prints are made until satisfactory print quality is obtained. On the other hand, published Japanese Pat. application No. 58-146832 describes a system wherein such test printing is made unnecessary by placing an array of photodetectors at the image plane and adjusting the position of the optical system in accordance with the detected value.

Whatever method is used for adjusting the positions of the LED array and the imaging lens array relative to reference pin 92 and reference holes 96 and 98, once that adjustment is made, brackets 90 and 94 are tightly screwed to print head 26. There is now precise locational relationships between the holes in bracket 94, pin 92 on bracket 90, LED array 14, and imaging lens array 12; and also precise locational relationships between V-shaped opening 80 in plate 82, pins 84 and 86 on the apparatus mainframe, and the surface of roller 29. Therefore, print head assembly 44 is readily removable from the electrophotographic apparatus and will have exact locational repeatability upon reinstallation. Since the reference surfaces of V-shaped opening 80 and pins 84 and 86 can be fixed accurately in every electrophotographic apparatus at time of manufacture, field replacement of print head assemblies can be effected without adjustment. Interchangeability of print head assemblies is assured.

There may exist applications of such critical focus requirements that final field adjustment of the distance of print head assembly 44 and the photosensitive surface is desirable. Such final adjustment can be provided by means for effecting limited relative movement between bracket 94 and pins 84 and 86, and between plate 82 and pin 92.

The invention has been described in detail with particular reference to a preferred embodiment thereof, but it will be understood that variations and modifications can be effected within the spirit and scope of the invention.

We claim:

1. In apparatus having (1) a photosensitive surface, (2) a print head having a linear array of light sources, and (3) a gradient index optical fiber imaging lens array with plural optical fibers having substantially the same total conjugate but which lens array is selectable from a group of lens arrays whose total conjugates vary from lens array to lens array within the group; the improvement comprising:
   locating means for removably supporting the print head relative to the photosensitive surface such that the light source array is spaced from the photosensitive surface by the total conjugate of the selected lens array, said locating means including
   A. means defining locating structure of predetermined fixed spacial relationship to the photosensitive surface, and
   B. means defining reference surfaces adjustably attached to the print head and cooperatively engageable with said locating structure to support the print head relative to the photosensitive surface,
   wherein the reference surfaces and the locating structure comprise pins and apertures of substantially larger size than said pins to freely receive said pins, said pins automatically resting against locatings surfaces of said apertures upon mounting of said print head to provide the support for said print head and to accurately locate said print head relative to said photosensitive surface; and
   mounting means for fixatively supporting the imaging lens array to the print head such that the lens array is centered between the light source array and the photosensitive surface.

2. The improvement as defined in claim 1 wherein said reference surfaces defining means are fixed on brackets, the brackets being adjustably positioned on the print head.

* * * * *